United States Patent [19]

Peter

[11] Patent Number: 4,910,237
[45] Date of Patent: Mar. 20, 1990

[54] PRODUCING RUBBER MIXTURES IN COMBINATION MASTER BATCH AND FINAL MIXER UTILIZING RAM- AND RAM-LESS KNEADERS

[76] Inventor: Julius Peter, Tiergartenstr. 107, 3000 Hannover 71, Fed. Rep. of Germany

[21] Appl. No.: 149,718

[22] Filed: Jan. 29, 1988

[30] Foreign Application Priority Data

Jan. 30, 1987 [DE] Fed. Rep. of Germany ....... 3702833

[51] Int. Cl.⁴ .............................................. B01F 3/10
[52] U.S. Cl. .................................... 523/351; 422/135; 523/351
[58] Field of Search ................. 523/351; 422/135, 131

[56] References Cited

U.S. PATENT DOCUMENTS 3,294,720 12/1966 Beber et al. .......................... 523/346
4,161,419 7/1979 Alia ..................................... 523/351

Primary Examiner—Joseph L. Schofer
Assistant Examiner—Thomas R. Weber
Attorney, Agent, or Firm—Robert W. Becker & Associates

[57] ABSTRACT

A method and apparatus for producing rubber mixtures in two stages, namely a master-batching stage and a final mixing stage, with the maximum temperature during final mixing being less than the maximum temperature during master batching. In order to reduce the overall mixing time, and in order to simplify the mixing apparatus, the material that is to be mixed is passed successively through a master batcher and then a final mixer. The material that is to be mixed is transferred or conveyed from the master batcher to the final mixer via the force of gravity without intermediate storage thereof. After the master batching, the material that is to be mixed is cooled in the final mixer. During cooling and final mixing of a first charge in the final mixer, master batching of a subsequent charge is already effected in the master batcher. The master batcher and the final mixer are expediently combined in such a way that the master batcher is a ram kneader, and the final mixer is a ram-less kneader.

6 Claims, 2 Drawing Sheets

PRODUCING RUBBER MIXTURES IN COMBINATION MASTER BATCH AND FINAL MIXER UTILIZING RAM- AND RAM-LESS KNEADERS

BACKGROUND OF THE INVENTION

The present invention relates to a method of producing rubber mixtures in two stages, namely a master-batching stage and a final mixing stage, with the maximum temperature during final mixing being less than the maximum temperature during master batching. The method may also be a discontinuous method that uses kneaders, with material that is to be mixed passing successively through the kneaders. The present invention also relates to an apparatus for carrying out the aforementioned methods.

Of particular significance during the manufacture of rubber articles is the production of vulcanizable rubber mixtures from the necessary components, namely rubber, fillers, and other additives, and from the components that are necessary for vulcanization or bonding. Next to the units for vulcanization, the units needed for mixing and preparation represent the greatest investment in a rubber plant. Internal mixers are primarily used to manufacture such mixtures.

The mixing process performs two different tasks:

(a) on the one hand, the additives that are necessary in order to provide the preparation and usage properties, such as, for example, highly active and other fillers, plasticizers, processing aids, anti-oxidants, ozone protectors, pigments, etc., must be dispersed as rapidly and as effectively as possible. In this connection, depending upon the mixing unit that is used, the type of mixture, and the mixing conditions, temperatures of up to 150° C. and even greater can be achieved during master batching without damaging the mixture; and (b) on the other hand, however, the materials that are necessary for polymerization and bonding to substrates, such as, for example, sulfur and vulcanization accelerators, peroxides, vulcanization resins, RF-systems, etc., must be added in at such low temperatures that in so doing no premature reactions occur. With moist accelerator and bonding systems, the temperatures may not exceed 100° to 110° C. during final mixing.

Where larger quantities have to be dealt with, especially in the tire industry, a two-stage process is therefore used for the mixing. First of all, the additives are added to the rubber at relatively high temperatures; this is the master batching. The mixture is then cooled in a recovery unit and subsequently in air or water, and is finally intermediately stored. Then, in a second stage, the materials that are necessary for polymerization and bonding to substrates are added at a temperature that is lower than the master batch temperature; this is the final mixing. During such final mixing, the temperature must be low enough that the rubber does not already begin to polymerize in the mixer.

The manner in which the heretofore known mixing process carries out these two stages entails expensive transportation within the plant area, increases the occurrence of unusable residual quantities, and requires a dosing of the respective mixture components prior to both stages of the process.

In order to avoid these drawbacks, so-called single-stage kneading processes have been developed where the two decisive stages of the process, namely the master batching and the final mixing, accompanied by the interposition of a cooling process, are effected one after the other within a single unit. However, kneaders that operate in this fashion work too slowly. For the large quantities that are required to be dealt with in tire plants, several of these kneaders must be installed parallel to one another. Thus, these kneaders would require an investment that is too great, and would require too much space in a plant.

It is therefore an object of the present invention to shorten the overall mixing time, and to simplify the mixing apparatus.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
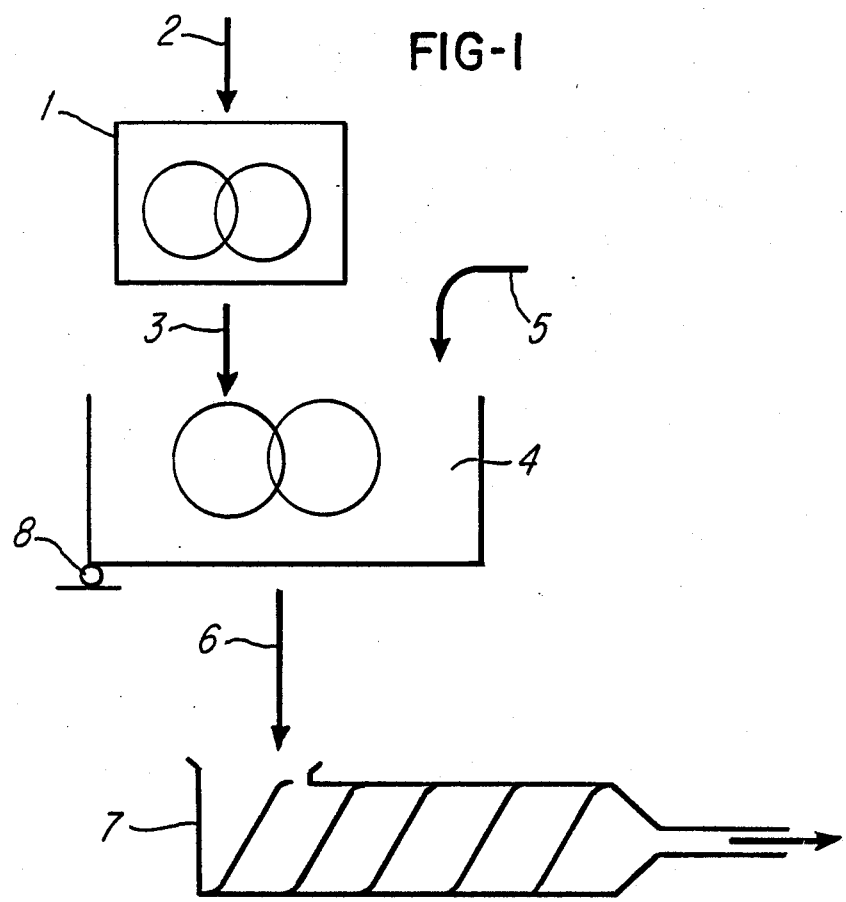
FIG. 1 is a view that schematically illustrates one exemplary embodiment of the inventive apparatus for carrying out the method of the present invention.

Pursuant to one inventive variant, the method of the present invention is characterized primarily by the steps of: having the material that is to be mixed pass successively through a master batcher and then a final mixer, including conveying the material that is to be mixed from the master batcher to the final mixer via the force of gravity without the intermediate storage thereof; after the master batching, cooling the material that is to be mixed in the final mixer; and during cooling and final mixing of a first charge in the final mixer, effecting master batching of a subsequent charge in the master batcher. Thus, pursuant to the present invention, the master batcher and the final mixer are expediently combined in such a way that the master batcher is a ram kneader, and the final mixer is a ram-less kneader.

Pursuant to another inventive variant, the method of the present invention may be characterized primarily by the steps of: having material that is to be mixed pass through a first kneader that is in the form of a ram kneader and forms a master batcher; conveying the material that is to be mixed, without intermediate storage thereof, from the first kneader to a second kneader, which is in the form of a ram-less kneader and forms a final mixer; after the master batching, cooling the material that is to be mixed in the second kneader, which is larger than the first kneader; and during cooling and final mixing of a first charge in the second kneader, effecting master batching of a subsequent charge in the first kneader.

In contrast to the so-called single-stage process, which should actually be called a single-unit process, with the present invention considerable time is saved by the contemporaneous master batching and final mixing. The combination unit that operates pursuant to the present invention makes it possible, by specializing the final mixer for cooling and final mixing, to have a throughput of material that is to be mixed that is at least as rapid as was possible with two single-unit mixer that operated parallel to one another. However, the inventive combination of the two mixers into a single apparatus is considerably simpler and less expensive, because in so doing only one of the two kneaders, namely the master batcher, has to be an expensive ram kneader. Furthermore, only the master batcher has to have the enormous power and capability that is required to plasticize a cold rubber mixture, whereas the final mixer has only to be designed for plasticizing the finished master batch, which is at approximately 100° C., and hence is considerably more flowable. For this reason, the final mixer expediently has at most 30% of the power of the master batcher.

Shortening the initial cooling phase that is effected in the final mixer helps to further accelerate the process. This shortening of the cooling phase is made possible by having the cooling surfaces of the final mixer be 10 to 60%, and preferably 15 to 50%, greater than the surfaces of the master batcher. This can be achieved either by a particularly close arrangement of the blades of the final mixer, and/or by having the overall final mixer larger, i.e. with a greater capacity, than the master batcher. The mixers may be provided with cooling channels, whereby the least thickness between the cooling channels and those wall surfaces that face the material which is to be mixed is expediently smaller for the final mixer than for the master batcher. This feature is permitted by a low mechanical stressing of the final mixer, and provide a particularly low resistance to the transfer of heat from the material that is to be mixed to the cooling channels in the blades and the casing of the final mixer.

Final mixing is advantageously accelerated by effecting the addition of the polymerizing material and/or the reactive materials that serve for the bonding on the substrates, which addition takes place at the beginning of the final mixing, in such a way that this material or materials are distributed over the free surface of the material that is to be mixed. In contrast to the concentrated application of additive that up to now has been customary, the inventive surface application of additive provides a higher degree of uniformity right from the beginning. This improvement is made possible by the ram-less design of the final mixer.

The amount of time that the material that is to be mixed stays in the final mixer can be reduced even further if the polymerization agents and/or the reactive materials that serve for the bonding on the substrates, all of which are added at the beginning of the final mixer, are preliminarily dispersed only coarsely in the final mixer, and are subsequently finely dispersed in a roller mechanism, or in a single or double mixing screw. In the aforementioned listing, the three alternative mixing mechanisms are arranged in order of their capacity. When the inventive method is used in plants that consume a lot of rubber, where the present invention is particularly applicable because there the accelerated throughput of rubber has the greatest effect, the double mixing screw is preferred due to its large capacity.

In order to protect the operating personnel from organic vapors that are injurious to health, and to keep dirt away from the material that is to be mixed, transfer of this material from the master batcher to the final mixer is expediently effected in such a way as to be sealed from, or exclude, dust and air. Such an exclusion is particularly easy to realize with the ram-less configuration of the final mixer because the master-batched material can pass directly into the final mixer from the channel that is sealed against dust and air. The channel construction is particularly straightforward if no mechanical power has to be introduced from the outside for the transfer of the material that is to be mixed. For this reason, it is advisable to place the master batcher as high above the final mixer as possible, and also to offset the master batcher at an angle from the final mixer at least to such an extent that the force of gravity alone is sufficient to overcome all frictional resistances that are encountered during the transfer of the material that is to be mixed from the master batcher to the final mixer. In addition, arranging the mixers one above the other reduces the amount of space that is required.

In contrast to the heretofore known two-stage process, the present invention eliminates the need for transferring the material that is to be mixed from the master batcher kneader to the intermediate deposit site, and then from the latter to the final mixing kneader, and hence also eliminates the space that is required for intermediate storage. Also eliminated is the heretofore required weighing or dosing of the master batch prior to the final mixing. For operation, it is now merely necessary to have a kneader operator and one other operator. Furthermore, instead of two complete kneader units, two preparation units, and two batch-off units, it is now merely necessary to have a single kneader unit, a second mixing casing, and only a single preparation unit and a single batch-off unit. Since with the present invention the master batching and the final mixing are effected at temperatures greater than ambient temperature, the previously required energy consumption for plasticizing prior to final mixing is eliminated. Last but not least, cleaning costs are lower with the present invention, because not only one preparation unit but also one batch-off unit are eliminated; a change of mixtures is thus facilitated.

It is, of course, also possible to initially add non-reactive materials in the lower kneader.

The material that is to be mixed is expediently discharged from the lower kneader into a roller mechanism or a single or double mixing screw disposed therebelow, whereupon the material is further processed in a customary manner. A mixing screw, and especially a double mixing screw, is advantageous because it does not limit the size of the mixing apparatus, especially not even if packing mechanisms are used to charge the unit. In such units, which are well known, an excellent dispersion of the components of the mixture can be achieved at relatively low temperatures.

Subsequently, a strip, for example a tread rib, is extruded and is processed or dressed in the customary batch-off units.

During the mixing process, the temperature and the energy input are measured in both kneaders, and the mixing process is controlled on-line. Furthermore, it is advisable to use characterizing data from the mixing screw, and from the mixed material that exits therefrom, such as, for example, extrusion expansion, surface quality, etc., again for on-line control. This makes it possible to limit the quality control to merely determining the vulcanization characteristics and data.

Further specific features of the present invention will be described in detail subsequently.

DESCRIPTION OF PREFERRED EMBODIMENTS

Referring now to the drawings in detail, FIG. 1 shows a press or ram kneader 1 that is provided for producing a master batch and is disposed at the top. The arrow 2 indicates the flowing-in of the master batch components. As indicated by the arrow 3, the finished master batch is conveyed by the force of gravity into the ram-less kneader 4 without being intermediately stored. In this stage of the process, the speed of the kneader is so low that a very rapid cooling-off is achieved. After the mixture has been cooled to below the critical temperature, which for most accelerator systems is between 100° and 110° C., the reactive materials are added, as indicated by the arrow 5. The vulcanizable final mixture is formed by dispersion. As indicated by the arrow 6, this vulcanizable final mixture is discharged into a worm mixer 7. To facilitate this step, the lower kneader 4 can be tilted, as indicated by the hinge joint 8.

As shown by the exemplary embodiment illustrated schematically in FIG. 1, the method of the present invention provides a very compact construction without the need for intermediate storage, which would require more space and would also utilize transport capability.

Figure 2:
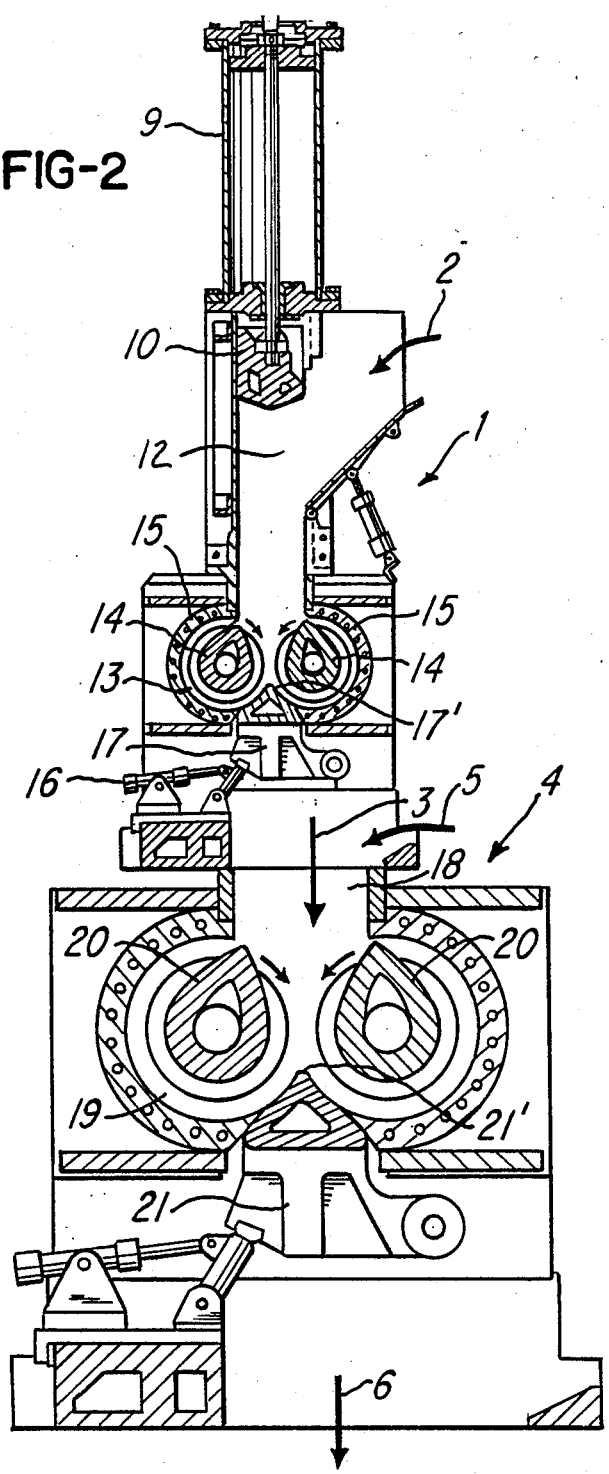
FIG. 2 is a vertical cross-sectional view through one exemplary embodiment of the inventive apparatus for carrying out the method of the present invention.

Referring now to the apparatus of FIG. 2, the ram kneader 1 is provided at the top with a working cylinder 9 for raising and lowering a press or ram 10, which in FIG. 2 is disposed in its upper end position to allow the mixing chamber 13 to be charged with the master batch components. These components are added in the direction of the arrow 2 via a hopper 12. After charging has been completed, the ram 10 is lowered until it closes off the top of the mixing chamber 13, which is provided with two rotors 14. In a manner known per se, the sides of the mixing chamber 13 are closed off by casing parts 15. These parts, and the rotors disposed therein, can have a conventional construction, and in particular are also equipped with suitable cooling devices.

The bottom of the mixing chamber 13 is closed off by a saddle 17 that can be opened and closed by the working cylinder 16; the top 17' of the saddle extends into the mixing chamber 13. After the master batch is completed, the mixing chamber 13 is emptied from the bottom by opening the saddle 17. In so doing, the master batch is discharged from the mixing chamber 13 directly into the mixing chamber 19 via the continuously open, i.e. ram-less, inlet 18 thereof. The mixing chamber 19 of the kneader 4 is also provided with two rotors 20. In comparison to the ram kneader 1, the mixing chamber 19 of the kneader 4 is considerably larger. Furthermore, the rotors 20 operate at a relatively lower speed in order to assure that the aforementioned cooling of the material that is to be mixed occurs. After the reactive materials have been added in the direction of the arrow 5, the final mixture is withdrawn by opening the hinged saddle 21 of the kneader 4 toward the bottom; the top 21' of the saddle extends into the mixing chamber 19. The final mixture is then processed further in the manner described in connection with FIG. 1.

During the time that the mixture is being processed in the kneader 4, the next charge is already being prepared in the ram kneader 1. Should the capacity of the kneader 1 be too great, or the capacity of the kneader 4 be too small for the aforementioned operations, a second kneader 4 could be installed. The two kneaders 4 would then preferably be disposed next to one another in order to be able to selectively charge one or the other of the adjacent kneaders 4. This splitting-up of the material that is to be mixed to two kneaders 4 can be accomplished in a simple manner by disposing a pivotable deflector below the ram kneader 1.

The present invention is, of course, in no way restricted to the specific disclosure of the specification and drawings, but also encompasses any modifications within the scope of the appended claims.

What I claim is:

1. A method of producing rubber mixtures to save time by contemporaneous master batching and final mixing in two stages, namely a master-batching stage having a ram kneader and a final mixing stage having a ram-less kneader including a continuously open ram-less inlet, with the maximum temperature during final mixing being less than the maximum temperature during master batching; said method in combination comprises the steps of:

first passing the material that is to be mixed successively through a master batcher having enormous power capability required to plasticize a cold rubber mixture and then a final mixer having at most 30% of power of the master-batching stage and adapted only for plasticizing the finished master batch which is at approximately 100° C. and hence is considerably more flowable, including isolating the master batcher from the final mixer subject to removal of said isolating and thereupon transferring said material that is to be mixed from said master batcher directly to said final mixer via the force of gravity without intermediate storage thereof by arranging the master batcher and final mixer in tandem one above the other to reduce the amount of space required;

after master batching, cooling said material that is to be mixed in said final mixer; and during cooling and final mixing of a first charge in said final mixer, effecting master batching of a subsequent charge in said master batcher.

2. A method in combination according to claim 1, which includes the steps of: adding, to the beginning of said final mixing stage, at least one of the materials selected from the group consisting of polymerization agents and reactive materials that serve for bonding on substrates; coarsely dispersing said at least one material in said mixture in said final mixer; and subsequently finely dispersing said at least one material in said mixture in a mixing mechanism.

3. A method in combination according to claim 2, which includes the step of undertaking said finely dispersing step in a double mixing screw.

4. A method in combination according to claim 1, in which said material that is to be mixed has a free surface after being transferred from said master batcher to said final mixer; and which includes the steps of: adding, to the beginning of said final mixing stage, at least one of the materials selected from the group consisting of polymerization agents and reactive materials that serve for bonding or substrates; and distributing said at least one added material to said free surface of said material that is to be mixed.

5. A method in combination according to claim 1, which includes the step of effecting said transfer of said material that is to be mixed from said master batcher to said final mixer in such a way as to exclude dust and air.

6. A discontinuous method of producing rubber mixtures in two stages, namely a contemporaneous master-batching stage and a final mixing stage by combination of two mixers into a single apparatus respectively arranged in tandem one above the other to save space, by passing the material that is to be mixed successively through kneaders, with the maximum temperature during final mixing being less than the maximum temperature during master batching; said method in combination comprising the steps of:
first passing the material that is to be mixed through a first kneader that is a ram kneader and serves as a master batcher having enormous power capability required to plasticize a cold rubber mixture;
isolating the master-batching stage from the final mixing stage subject to removal of said isolating and thereupon transferring said material that is to be mixed, without intermediate storage thereof, from said first kneader directly to a second kneader, which is a ram-less kneader having a continuously open ram-less inlet and serves as a final mixer having at most 30% of power of the master-batching stage and adapted only for plasticizing the finished master batch which is at approximately 100° C. and hence is considerably more favorable;
after master batching, cooling said material that is to be mixed in said second kneader, which is larger than said first kneader; and
during cooling and final mixing of a first charge in said second kneader, effecting master batching of a subsequent charge in said first kneader.

* * * * *